United States Patent
Nishikawa

(10) Patent No.: US 8,374,521 B2
(45) Date of Patent: Feb. 12, 2013

(54) IMAGE FORMING APPARATUS, METHOD OF CONTROLLING IMAGE FORMING APPARATUS, AND STORAGE MEDIUM STORING PROGRAM

(75) Inventor: Fumikazu Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 12/958,087

(22) Filed: Dec. 1, 2010

(65) Prior Publication Data
US 2011/0170893 A1    Jul. 14, 2011

(30) Foreign Application Priority Data
Jan. 8, 2010  (JP) ................................ 2010-003411

(51) Int. Cl.
*G03G 15/00* (2006.01)
(52) U.S. Cl. ...................................................... 399/82
(58) Field of Classification Search ............... 399/82, 399/83
See application file for complete search history.

(56) References Cited

U.S. PATENT DOCUMENTS

| | | | |
|---|---|---|---|
| 8,233,815 B2 * | 7/2012 | Inenaga et al. ............ | 399/81 |
| 2008/0063423 A1 * | 3/2008 | Matoba ...................... | 399/76 |
| 2009/0317121 A1 * | 12/2009 | Tomita et al. .............. | 399/82 |
| 2010/0007909 A1 * | 1/2010 | Aikens ....................... | 358/1.15 |

FOREIGN PATENT DOCUMENTS
JP    2002029123 A    1/2002

OTHER PUBLICATIONS

Machine translation of Someya (JP 2002029123 A) listend in IDS, pub date Jan. 29, 2002.*

* cited by examiner

*Primary Examiner* — Walter L Lindsay, Jr.
*Assistant Examiner* — Frederick Wenderoth
(74) *Attorney, Agent, or Firm* — Fitzpatrick, Cella, Harper & Scinto

(57) ABSTRACT

This invention provides an image forming apparatus that includes a storage area to store a print job. Whether the type of printing medium set in the received print job is the same as the type of printing medium provided in the image forming apparatus is determined. Print processing is suspended after storing the print job in the storage area when it is determined that the former type is not the same as the latter type, and the suspension time for which the print job has been suspended is measured. The suspension time is compared with a predetermined period, and the print job is deleted from the storage area when the suspension time reaches the predetermined period.

9 Claims, 11 Drawing Sheets

PENDING JOB LIST

| JOB NAME | SUSPENSION TIME |
|---|---|
| JOB C | 3 HOURS AND 15 MINUTES |
| JOB B | 6 HOURS AND 29 MINUTES |
| JOB A | 23 HOURS AND 55 MINUTES |

☐ JOB SUSPENSION TIME LIMIT
☐ 1 HOUR
☐ 3 HOURS
☐ 12 HOURS
☑ 24 HOURS
☐ 48 HOURS
☐ INDEFINITE PERIOD OF TIME

WARNING

⚠ THERE IS JOB, SUSPENSION TIME LIMIT OF WHICH IS APPROACHING

JOB NAME: JOB A

THIS JOB WILL BE AUTOMATICALLY DELETED FIVE MINUTES LATER

FIG. 7A

| RATIO OF FREE SPACE IN TEMPORARY STORAGE AREA | SUSPENSION TIME LIMIT |
|---|---|
| 50% OR MORE | 48 HOURS |
| 30% (INCLUSIVE) TO 50% (EXCLUSIVE) | 24 HOURS |
| 20% (INCLUSIVE) TO 30% (EXCLUSIVE) | 12 HOURS |
| 10% (INCLUSIVE) TO 20% (EXCLUSIVE) | 3 HOURS |
| LESS THAN 10% | 1 HOURS |

FIG. 7B

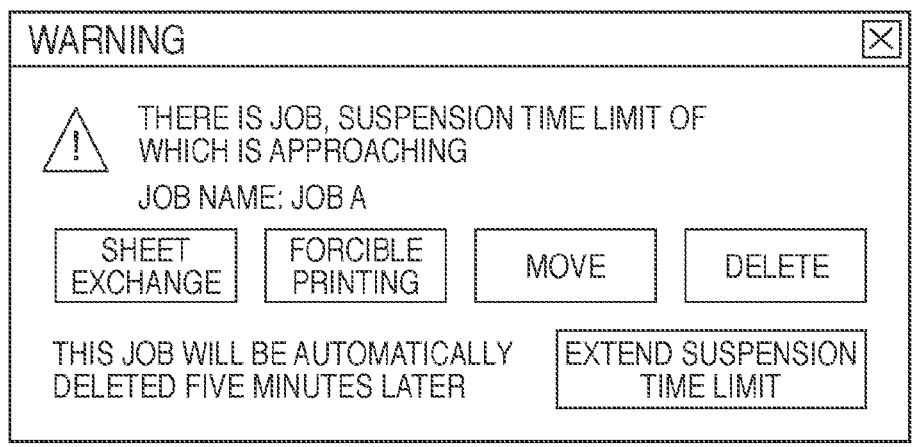

WARNING

THERE IS JOB, SUSPENSION TIME LIMIT OF WHICH IS APPROACHING
JOB NAME: JOB A

[SHEET EXCHANGE] [FORCIBLE PRINTING] [MOVE] [DELETE]

THIS JOB WILL BE AUTOMATICALLY DELETED FIVE MINUTES LATER    [EXTEND SUSPENSION TIME LIMIT]

FIG. 7C

PENDING JOB LIST

| JOB NAME | SUSPENSION TIME |
|---|---|
| JOB C | 3 HOURS AND 15 MINUTES |
| JOB B | 6 HOURS AND 29 MINUTES |
| JOB A | 0 HOURS AND 00 MINUTES |

FIG. 7D

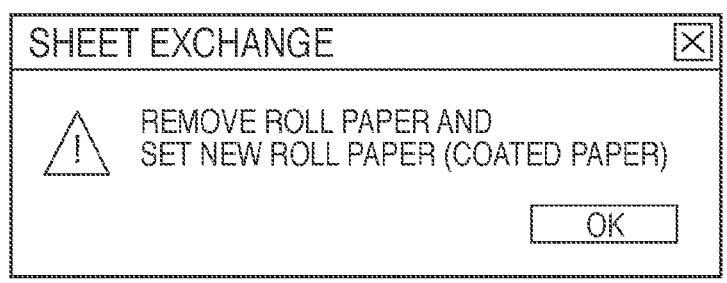

SHEET EXCHANGE

REMOVE ROLL PAPER AND SET NEW ROLL PAPER (COATED PAPER)

[OK]

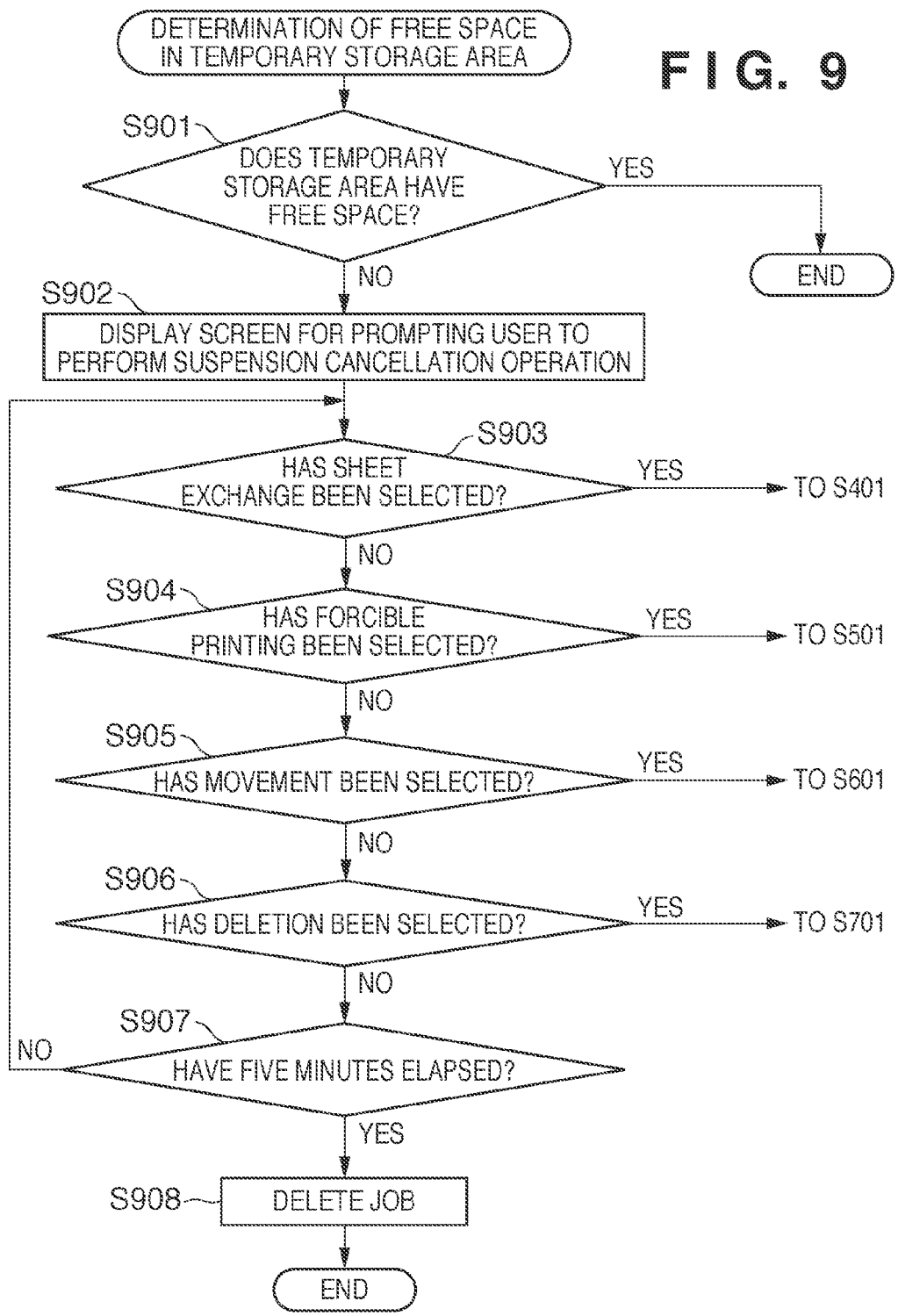

IMAGE FORMING APPARATUS, METHOD OF CONTROLLING IMAGE FORMING APPARATUS, AND STORAGE MEDIUM STORING PROGRAM

BACKGROUND OF THE INVENTION

1. Field of the Invention

The present invention relates to an image forming apparatus which receives a print job and performs print processing, a method of controlling the image forming apparatus, and a storage medium storing a program.

2. Description of the Related Art

A print system includes a host computer that generates and transmits a print job to an image forming apparatus, and a print apparatus (image forming apparatus), which prints using the print job received from the host computer. In such a print system, the print job received by the image forming apparatus describes, for example, the arrangement and expression method of texts, images, etc., and the type and size of printing medium used. The image forming apparatus analyzes the received print job to rasterize it into a bitmap image. The rasterized image is printed on the conveyed printing medium using a printing member such as a photosensitive drum or a printing head.

With the recent improvements in image quality and functionality and increase in size of image forming apparatuses, the size of print data designated in a print job is increasing. Hence, an image forming apparatus, which includes a built-in mass storage device typified by a hard disk, has come to be widely used so as to handle large-size data inside the apparatus. In such an image forming apparatus, a hard disk is not only simply used as a buffer memory for print processing but also used as a device for implementing functions having various kinds of added values. In, for example, printing a plurality of copies of print data, after the print data is transmitted from the host computer to the image forming apparatus only once and stored in the hard disk, it is read out from the hard disk by a number of times equal to the number of copies, and is printed. Also, if the printing in progress fails due to, for example, a paper jam, the print data is read out again from the hard disk and printed again.

Moreover, a hard disk is used in another use application. When the type of printing medium set in the image forming apparatus is different from that designated in a print job, the image forming apparatus cannot normally print this job and therefore abnormally stops. When the image forming apparatus has stopped as in this case for a long period of time, it cannot print subsequent print jobs that match the type of printing medium set in this apparatus, either. To avoid this, in such a case, the image forming apparatus suspends print processing for the print job that cannot be normally printed, and temporarily saves it in the hard disk (such a print job will be referred to as a pending job hereinafter), instead of abnormally stopping. The image forming apparatus prints subsequent print jobs ahead of the pending job, thereby being prevented from becoming unavailable because of its abnormal stop (Japanese Patent Laid-Open No. 2002-29123).

Unfortunately, as the number of pending jobs increases, the free space on the hard disk may run short. When this occurs, the image forming apparatus cannot perform print processing even when it receives a new print job from the host computer.

SUMMARY OF THE INVENTION

An aspect of the present invention is to eliminate the above-mentioned problems with the conventional technology. The present invention provides an image forming apparatus which always secures a given storage area for print processing, a method of controlling the image forming apparatus, and a storage medium storing a program.

The present invention in its first aspect provides an image forming apparatus including a storage area to store a print job, the apparatus comprising, a reception unit configured to receive the print job; a determination unit configured to determine whether a type of printing medium set in the print job received by the reception unit is identical to a type of printing medium provided in the image forming apparatus; a suspension unit configured to suspend print processing after storing the print job in the storage area when the determination unit determines that the former type is not identical to the latter type; a measurement unit configured to measure a suspension time for which the print job has been suspended by the suspension unit; and a deletion unit configured to compare the suspension time with a predetermined period, and delete the print job from the storage area when the suspension time reaches the predetermined period.

The present invention in its second aspect provides a method which controls an image forming apparatus including a storage area to store a print job and is executed in the image forming apparatus, the method comprising the steps of: receiving the print job; determining whether a type of printing medium set in the print job received in the receiving is identical to a type of printing medium provided in the image forming apparatus; suspending print processing after storing the print job in the storage area when it is determined in the determining that the former type is not identical to the latter type; measuring a suspension time for which the print job has been suspended in the suspending; and comparing the suspension time with a predetermined period, and deleting the print job from the storage area when the suspension time reaches the predetermined period.

The present invention in its third aspect provides a computer-readable storage medium storing a program for causing a computer serving as an image forming apparatus including a storage area to store a print job to function to: receive the print job; determine whether a type of printing medium set in the received print job is identical to a type of printing medium provided in the image forming apparatus; suspend print processing after storing the print job in the storage area when it is determined that the former type is not identical to the latter type; measure a suspension time for which the print job has been suspended; and compare the suspension time with a predetermined period, and delete the print job from the storage area when the suspension time reaches the predetermined period.

According to the present invention, it is possible to suppress the occurrence of a situation in which a storage area for print processing runs short.

Further features of the present invention will become apparent from the following description of exemplary embodiments with reference to the attached drawings.

BRIEF DESCRIPTION OF THE DRAWINGS

FIGS. 7A, 7B, 7C, and 7D are views showing setting items and display screens for print jobs in the second embodiment;

FIG. 9 is a flowchart showing the operation procedure of an image forming apparatus in the third embodiment.

DESCRIPTION OF THE EMBODIMENTS

Figure 1A:
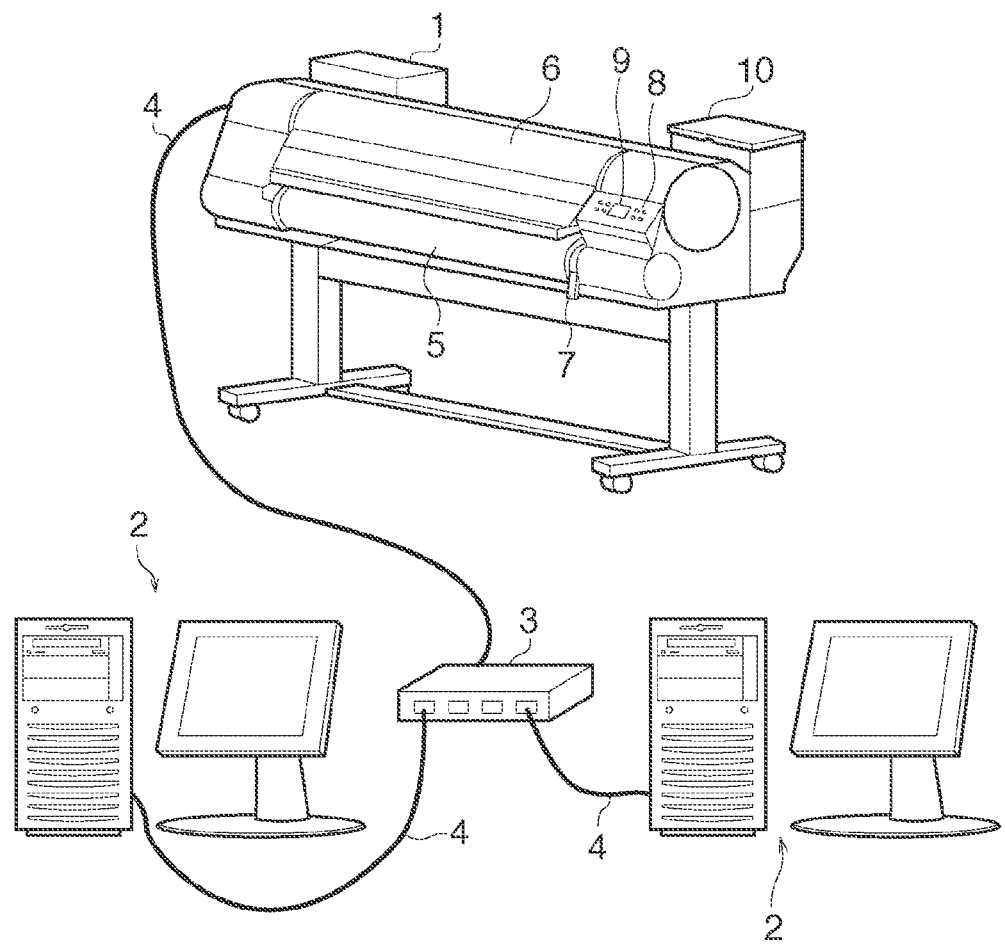
FIGS. 1A and 1B are views showing the arrangement of a print system in the first embodiment according to the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will not be given.

First Embodiment

Figure 1B:
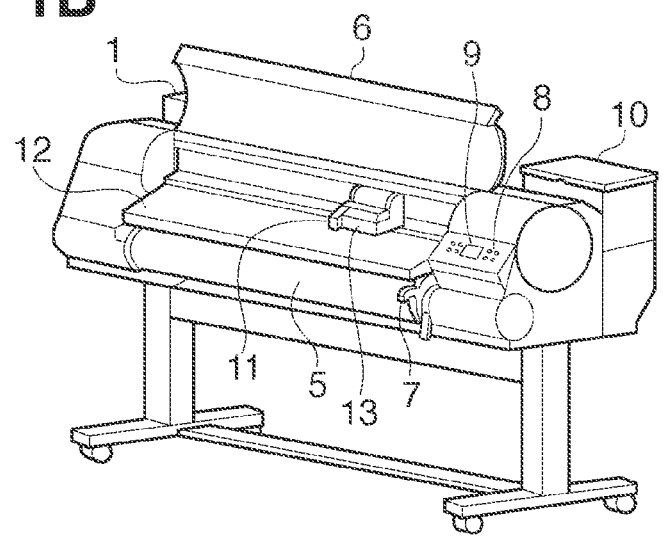

FIGS. 1A and 1B are views showing the arrangement of a print system in the first embodiment according to the present invention. Referring to FIG. 1A, an image forming apparatus 1 performs print processing on a printing medium such as a paper sheet based on information externally input to it or that held in it in advance. A plurality of host computers 2 are connected to the image forming apparatus 1 via a network hub 3 and a network cable 4, and transmit print data and pieces of information (print jobs) for controlling the image forming apparatus 1 to the image forming apparatus 1. Roll paper 5, which is wound in a roll form, can be set in the image forming apparatus 1. A main cover 6 opens/closes in feeding roll paper or replacing a printhead or a cutter unit (both will be described later) with a new one. FIG. 1A shows the state in which the main cover 6 is closed. A release lever 7 can be used to fix the roll paper 5 by pressing a roller (to be described later) against a platen (to be described later), or insert the roll paper 5 onto the platen by separating the roller from the platen. An operation key 8 is used to perform various types of settings associated with the operation of the image forming apparatus 1 or to solely use the image forming apparatus 1. A display panel 9 displays, for example, the status of the image forming apparatus 1 and setting contents in setting the operation of the image forming apparatus 1 using the operation key 8. The type of printing medium and the print image quality, for example, can also be set using the operation key 8 and display panel 9. An ink tank cover 10 opens/closes in attachment and replacement of an ink tank (to be described later). FIG. 1B shows the state in which the main cover 6 of the image forming apparatus 1 is open. A carriage 13 and a cutter unit 11 integrated with it are present inside the main cover 6, and are used for printing and sheet cutting, respectively, upon their lateral driving. A printing medium (to be referred to as a sheet hereinafter) is conveyed forward/backward on a platen 12.

Figure 2:
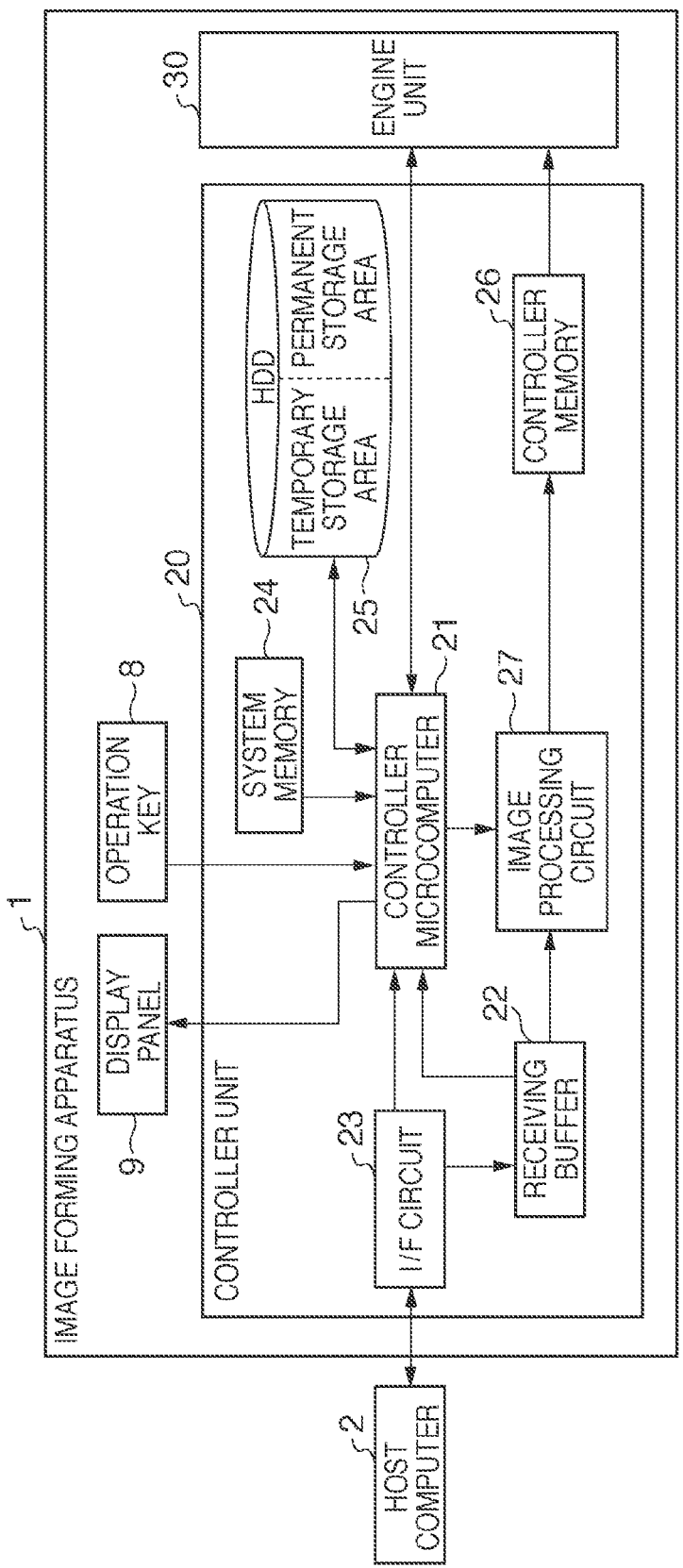
FIG. 2 is a block diagram showing the internal configuration of an image forming apparatus.

FIG. 2 is a block diagram showing the internal configuration of the image forming apparatus 1. The image forming apparatus 1 includes a controller unit 20 and engine unit 30, in addition to the operation key 8 and display panel 9 mentioned above. The controller unit 20 inputs a print job from the host computer 2 and analyzes it to generate bitmap print data which can be printed by the engine unit 30. Also, the controller unit 20 accepts an input via the operation key 8 to set, for example, the operating environment of the image forming apparatus 1 and to display, for example, the status of the image forming apparatus 1 and a screen, for prompting the user to operate the image forming apparatus 1 via the operation key 8, on the display panel 9. The engine unit 30 feeds paper, prints the print data generated by the engine unit 30 on the paper, and delivers the paper. If an abnormality such as a paper jam or a paper shortage occurs in the engine unit 30, the controller unit 20 is notified to that effect and, for example, displays the fact that an abnormality has occurred on the display panel 9 or performs notification processing to the host computer 2. A more detailed configuration and operation of the image forming apparatus 1 will be described below.

The controller unit 20 includes a controller microcomputer 21, a receiving buffer 22, an I/F circuit 23, a system memory 24, a hard disk (HDD) 25 serving as a storage area, a controller memory 26, and an image processing circuit 27. The controller microcomputer 21 performs, for example, analysis and image processing of an externally input print job and processing of converting this job into a bitmap format. The sequence of a print job will be described. First, a print job input from the host computer 2 is stored in the receiving buffer 22 via the I/F circuit 23, and a notification that the print job has been received is sent from the I/F circuit 23 to the controller microcomputer 21. Note that the print job includes image data for use in printing, and pieces of setting information such as the sheet size and type. The controller microcomputer 21 analyzes the received print job to issue instructions to the image processing circuit 27 and engine unit 30. The image data stored in the receiving buffer 22 is processed into bitmap image data by the image processing circuit 27, is stored in the controller memory 26, and is sent to the engine unit 30.

The externally input print job can also be stored in the HDD 25. The HDD 25 includes a temporary storage area and permanent storage area, each of which has a predetermined capacity. The temporary storage area is used as a volatile area which temporarily stores print jobs in a print standby status, and can store the print jobs until its free space runs short. The print job stored in the temporary storage area is deleted the moment its printing is completed. When the free space runs short as the print jobs in a print standby status accumulate, the image forming apparatus 1 can no longer receive subsequent print jobs from the host computer 2, and stands by for transfer of a print job from the host computer 2. In contrast, the permanent storage area is used as a nonvolatile area which permanently stores print jobs, and can store the print jobs until its free space runs short. The print job stored in the permanent storage area is kept stored even after its printing is completed. When the free space runs short as the stored jobs accumulate, the permanent storage area can no longer store subsequent print jobs.

The sequence of a print job when the HDD 25 is used will be described. The processing until a print job is stored in the receiving buffer 22 is the same as when the HDD 25 mentioned above is not used. The data stored in the receiving buffer 22 is transferred to and stored in the HDD 25. If a print job is set in the host computer 2 so as to remain even after its printing is completed, it is stored in the permanent storage area of the HDD 25. On the other hand, if a print job is set in the host computer 2 so as to be deleted after its printing is completed, it is stored in the temporary storage area of the HDD 25. An operation when a print job is set so as to be deleted after its printing is completed will be explained herein. The print job stored in the HDD 25 is read out to send the image data in it to the engine unit 30 via the image processing circuit 27 and controller memory 26 and print the image data. After printing is completed, the print job is deleted from the temporary storage area of the HDD 25.

The controller microcomputer 21 inputs operation contents designated via the operation key 8, and performs appropriate processing in accordance with the input contents. Also, the engine unit 30 notifies the controller microcomputer 21 of the print status and details of an error if it has occurred, and causes the display panel 9 to display to that effect or notifies the host computer 2 to that effect.

Figure 3A:
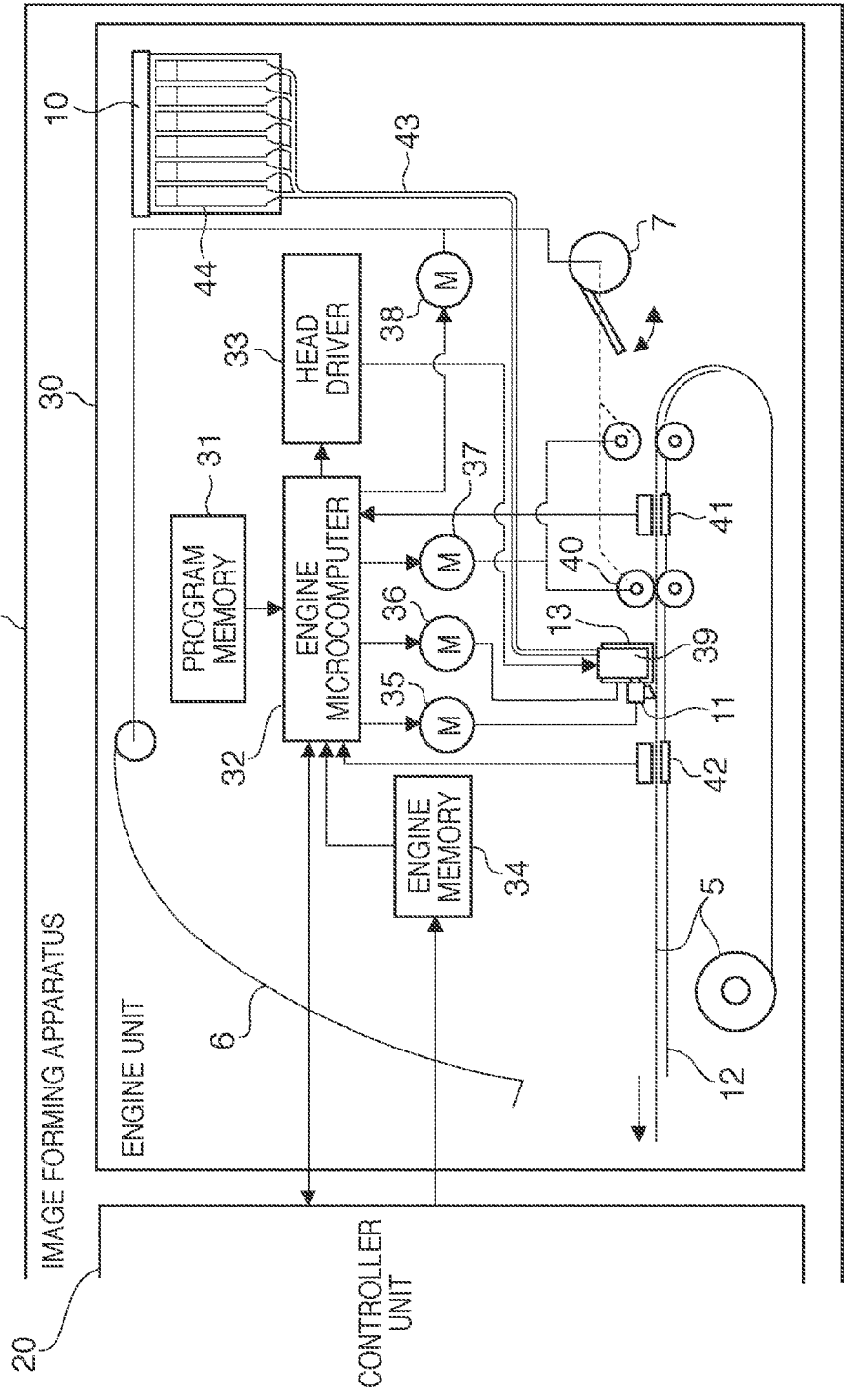
FIGS. 3A and 3B are block diagrams showing the internal configurations of engine units.

FIG. 3A is a block diagram showing the internal configuration of the engine unit 30, and shows the schematic appearance of the image forming apparatus 1 when viewed laterally. FIG. 3A shows the state in which the roll paper 5 is not fed, the main cover 6 is open, and the release lever 7 is released. As shown in FIG. 3A, the engine unit 30 includes an engine microcomputer 32, engine memory 34, carriage motor 36, printing head 39, and head driver 33. The engine unit 30 also includes a roller 40, an LF motor 37, a paper feed sensor 41, a paper delivery sensor 42, a cutter motor 35, a solenoid 38, a program memory 31, the ink tank cover 10, ink tanks 44, and ink tubes 43. In this embodiment, the ink tanks 44 and ink tubes 43 both have six colors. While the main cover 6 is open and the release lever 7 is released, the roller 40 and carriage 13 are not driven, as shown in FIG. 3A. Also, when the roller 40 separates from the platen 12 upon releasing the release lever 7, the roll paper 5 can be inserted onto the platen 12. After the insertion, paper feed and print operations start upon closing the main cover 6 and release lever 7.

Figure 3B:
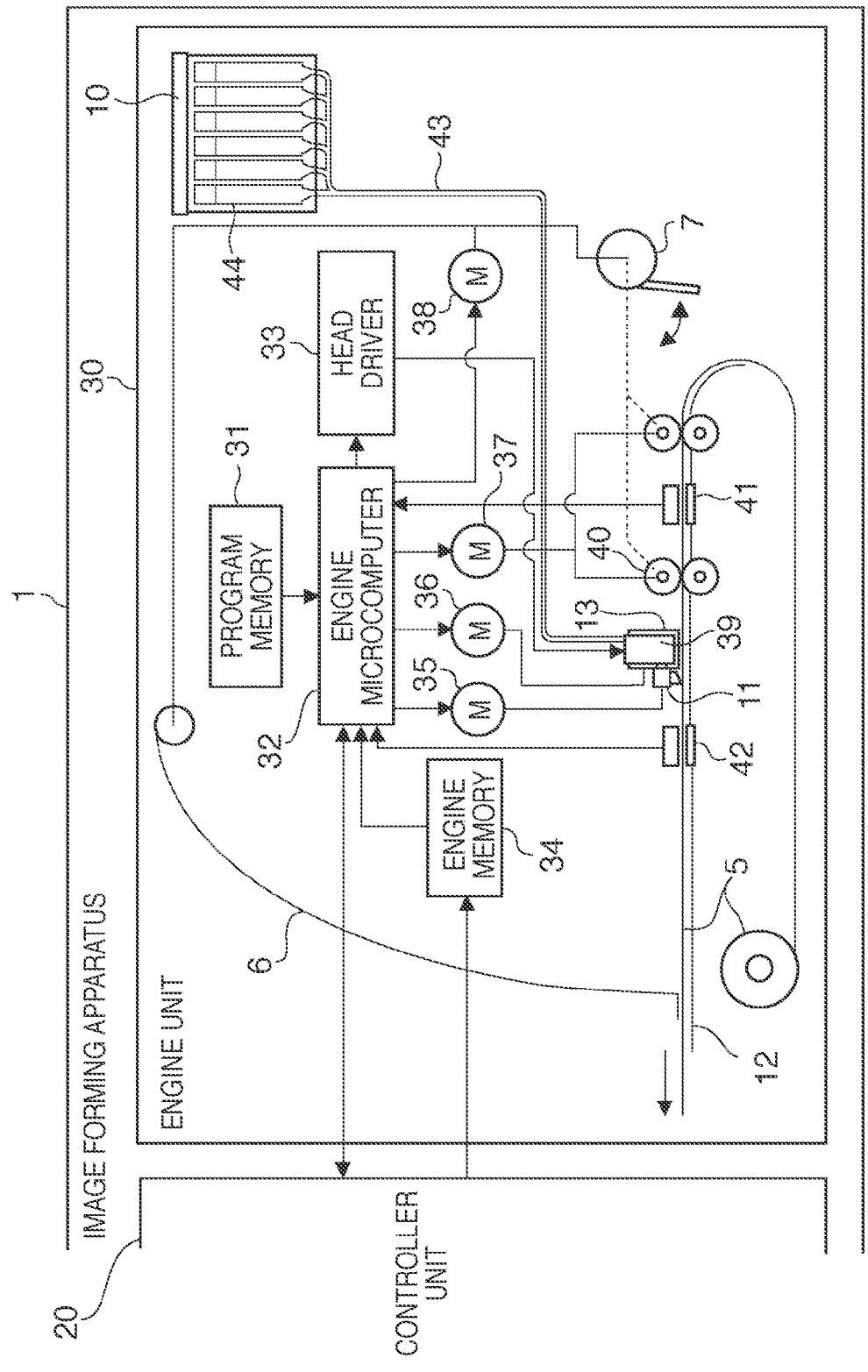

FIG. 3B shows the state in which the roll paper 5 is fed, and the main cover 6 and release lever 7 are closed. An operation shown in FIG. 3B will be explained herein. The engine microcomputer 32 controls, for example, feed and delivery of the roll paper 5 and the printing head 39. Bitmap image data sent from the controller unit 20 is stored in the engine memory 34. The roll paper 5 is fed and delivered by inserting the leading edge of the roll paper 5 into a paper feed unit by the user, and driving the LF motor 37 to rotate the roller 40. It is determined whether paper feed and delivery operations are normally in progress by detecting the presence/absence of the roll paper 5 by the paper feed sensor 41 and paper delivery sensor 42, respectively. The printing head 39 is integrated with the carriage 13, and driven by the head driver 33. Inks of six colors are supplied from the ink tanks 44 to the printing head 39 via the ink tubes 43.

The carriage 13 reciprocally moves in a direction perpendicular to the paper surface and the sheet conveyance direction using the carriage motor 36 to print on the roll paper 5 by the printing head 39. After printing is completed, the cutter unit 11 integrated with the carriage 13 is lowered by the cutter motor 35, and cuts the roll paper 5 upon driving the carriage 13 in a direction perpendicular to the paper surface and the print sheet conveyance direction. While the roll paper 5 is fed and printed, the main cover 6 and release lever 7 are locked in a closed state by the solenoid 38, so it is possible neither to open the main cover 6 nor to release the release lever 7. If the paper feed sensor 41 and paper delivery sensor 42 detect that the roll paper 5 has jammed, the engine microcomputer 32 cancels the printing and notifies the controller unit 20 to that effect.

Figure 4B:
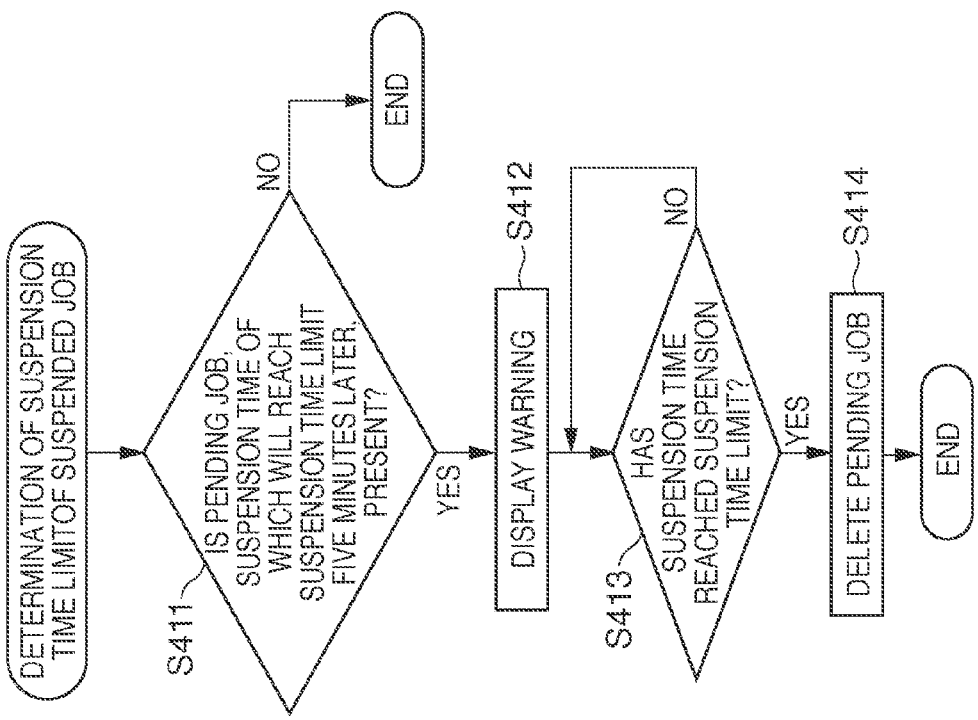
FIGS. 4A and 4B are flowcharts showing the operation procedures of the image forming apparatus in the first embodiment.
Figure 4A:
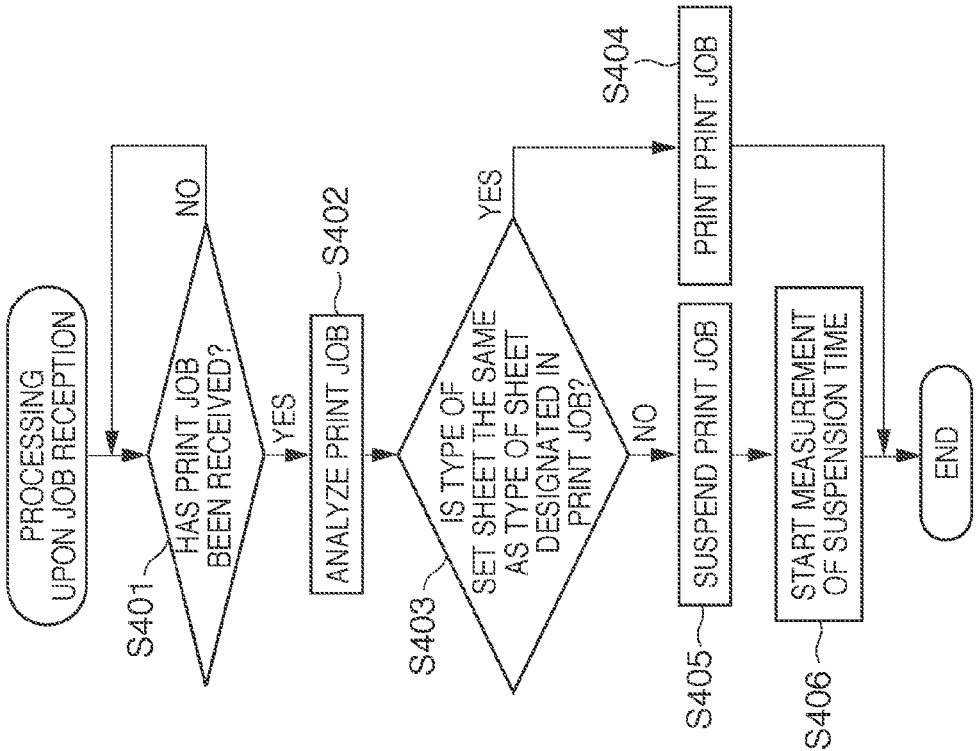

FIGS. 4A and 4B are flowcharts showing the operation procedures of the image forming apparatus 1 in the first embodiment according to the present invention. These procedures are executed by processing programs built in the system memory 24 shown in FIG. 2 and the program memory 31 shown in FIGS. 3A and 3B by the controller microcomputer 21 and the engine microcomputer 32, respectively. The controller microcomputer 21 and engine microcomputer 32 execute a control operation in cooperation with each other.

FIG. 4A is a flowchart showing the procedure of processing when a print job is received from the host computer 2. In step S401, it is determined whether the image forming apparatus 1 has received a print job from the host computer 2. If YES is determined in step S401, the received print job is analyzed in step S402. On the other hand, if NO is determined in step S401, the process in step S401 is repeated until it is determined that a print job has been received.

After the print job is analyzed in step S402, the sheet conditions designated in the print job and those set in the image forming apparatus 1 are compared with each other in step S403. In this embodiment, the types (the materials and sizes) of sheets set in the print job and the image forming apparatus 1, for example, are compared to determine whether they are the same. If YES is determined in step S403, the process advances to step S404, in which printing is performed using the print job, and the processing shown in FIG. 4A ends. On the other hand, if NO is determined in step S403, the process advances to step S405, in which the print job is suspended and saved in the temporary storage area of the HDD 25. The suspended print job will be referred to as a pending job hereinafter. In step S406, measurement of the suspension time of the pending job starts. The suspension time is measured by a timer counter built in the controller microcomputer 21.

In the processing shown in FIG. 4A, it is determined whether the type of sheet designated in the print job is the same as that set in the image forming apparatus 1, and if NO is determined, the print job is suspended and saved in the temporary storage area of the HDD 25. As a result, a print job which is received from the host computer 2 and matches the type of sheet set in the image forming apparatus 1 can be printed ahead of the pending job.

Figures 5A, 5B, 5C:
FIGS. 5A, 5B, and 5C are views showing setting items and display screens for print jobs in the first embodiment.

Next, in the processing shown in FIG. 4B, the suspension time limit (predetermined period of time) of the print job suspended in the processing shown in FIG. 4A is determined. This processing is performed at a predetermined time interval (for example, per minute). In step S411, it is determined whether a pending job, the suspension time of which will reach the suspension time limit five minutes later, is present. If NO is determined in step S411, the processing shown in FIG. 4B ends. Pending jobs are listed and managed in association with the name and suspension time of each pending job, as shown in FIG. 5A. Also, the suspension time limit is set via the operation key 8 and display panel 9. FIG. 5B is a view showing an example of a displayed setting screen. The suspension time limit is set commonly to all pending jobs and can be selected from 1 hour, 3 hours, 12 hours, 24 hours, 48 hours, and indefinite period of time. If indefinite period of time is selected, the suspension time never reaches the suspension time limit, so the processing shown in FIG. 4B ends after NO is determined in step S411. Referring to FIG. 5B, the suspension time limit is set to 24 hours, and the suspension time of pending job A shown in FIG. 5A is 23 hours and 55 minutes, so it is determined in step S411 that the suspension time will reach the suspension time limit five minutes later. Therefore, in step S412, a warning screen as shown in FIG. 5C is displayed on the host computer 2. The screen shown in FIG. 5C warns the user that a pending job will be deleted five minutes (that is, the suspension time limit) later. In step S413, it is determined whether the suspension time has reached the suspension time limit. If YES is determined in step S413, the pending job is deleted in step S414, and the processing shown in FIG. 4B ends. When the user takes an appropriate measure, such as exchange of the set sheets with those designated in the pending job, before the suspension time reaches the suspension time limit, the pending job becomes ready to be printed and is not deleted. On the other hand, if NO is determined in step S413, the determination in step S413 is repeated again.

In this embodiment, the user is warned that a suspended print job (pending job) will be deleted the moment the suspension time of this pending job soon reaches the suspension time limit (for example, five minutes later), and the pending job is deleted after the suspension time reaches the suspension time limit. As a result, the pending job can be prevented from endlessly staying in the temporary storage area of the HDD 25. This makes it possible to secure a given free space in the temporary storage area of the HDD 25. In this case, when a new print job is received, it can immediately be stored in the temporary storage area of the HDD 25 and start to be printed.

If the operation in this embodiment is not executed, the temporary storage area of the HDD 25 has no free space, thus making it impossible to store a new print job when it is received. When the print job cannot be stored, it cannot be analyzed and printed, either. Hence, an area in which a newly received print job can be stored must be secured by deleting an oldest pending job which has already been stored in the temporary storage area of the HDD 25. After the deletion of the pending job is completed, a newly received print job can be stored. Nevertheless, it takes a considerable time to search for and delete an oldest pending job, so it also takes a considerable time to store a newly received print job in the temporary storage area of the HDD 25. Especially an image forming apparatus capable of large-format printing has a large capacity for print jobs and, accordingly, requires a considerable time to delete a pending job. Furthermore, when an image forming apparatus is configured or set such that a pending job is deleted without leaving any trace in the HDD 25 upon attaching prime importance to security, it takes a more considerable time to complete the deletion. A print job can start to be printed after being stored, so its printing does not immediately start as a result, and it takes a considerable time for the user to obtain a print product.

In contrast to this, a given free space can always be secured in the temporary storage area of the HDD 25 by executing the operation in this embodiment. As a result, when a new print job is received, it can immediately be stored in the temporary storage area of the HDD 25 and start to be printed. Compared to the conventional case, there is no need to delete an oldest pending job stored in the temporary storage area of the HDD 25 when a new print job is received, thus making it possible to prevent the time taken to delete the pending job from wasting. This, in turn, makes it possible to greatly shorten the times until the start and end of printing upon receiving a print job.

Second Embodiment

Figure 6:
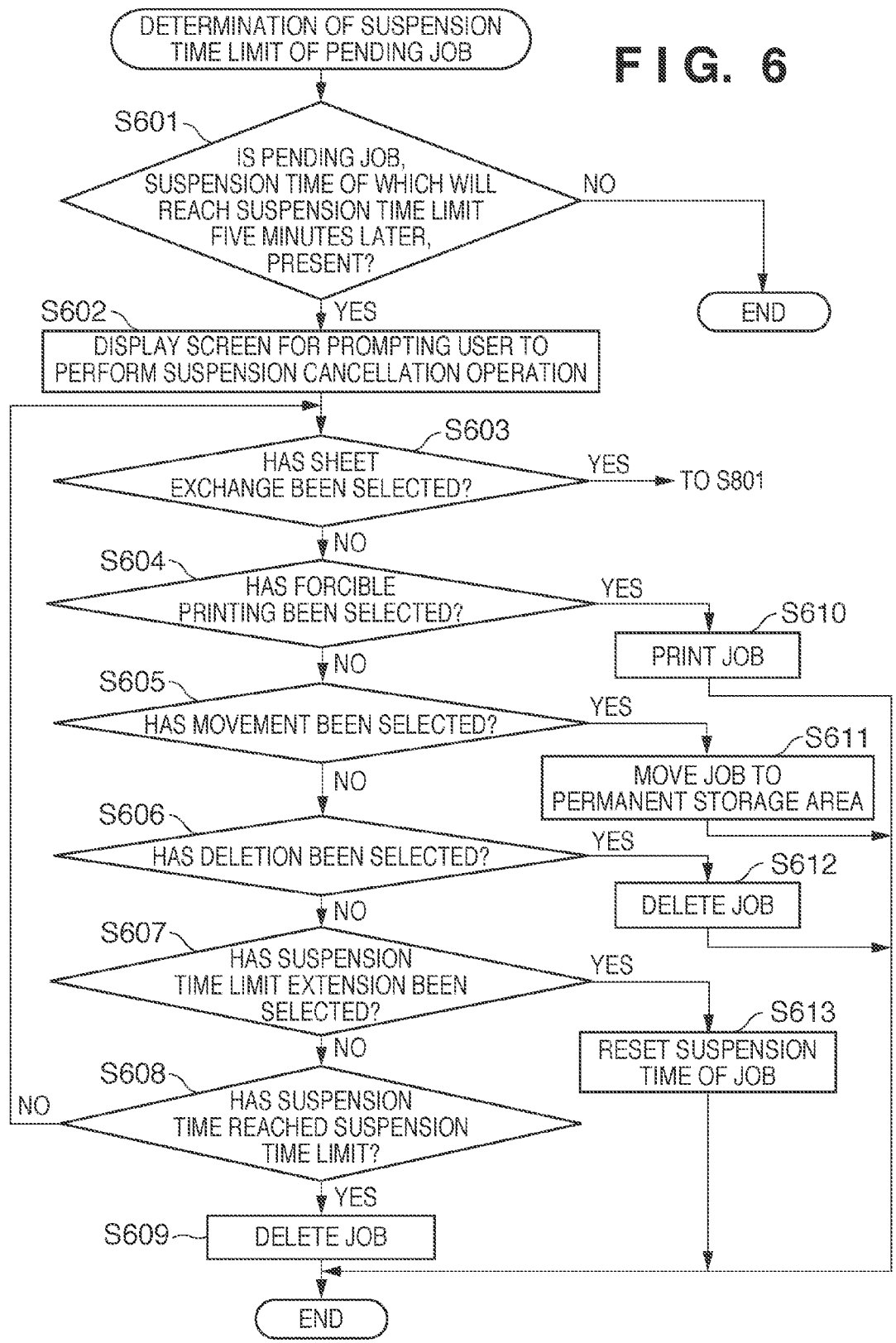
FIG. 6 is a flowchart showing the operation procedure of an image forming apparatus in the second embodiment.
Figure 8:
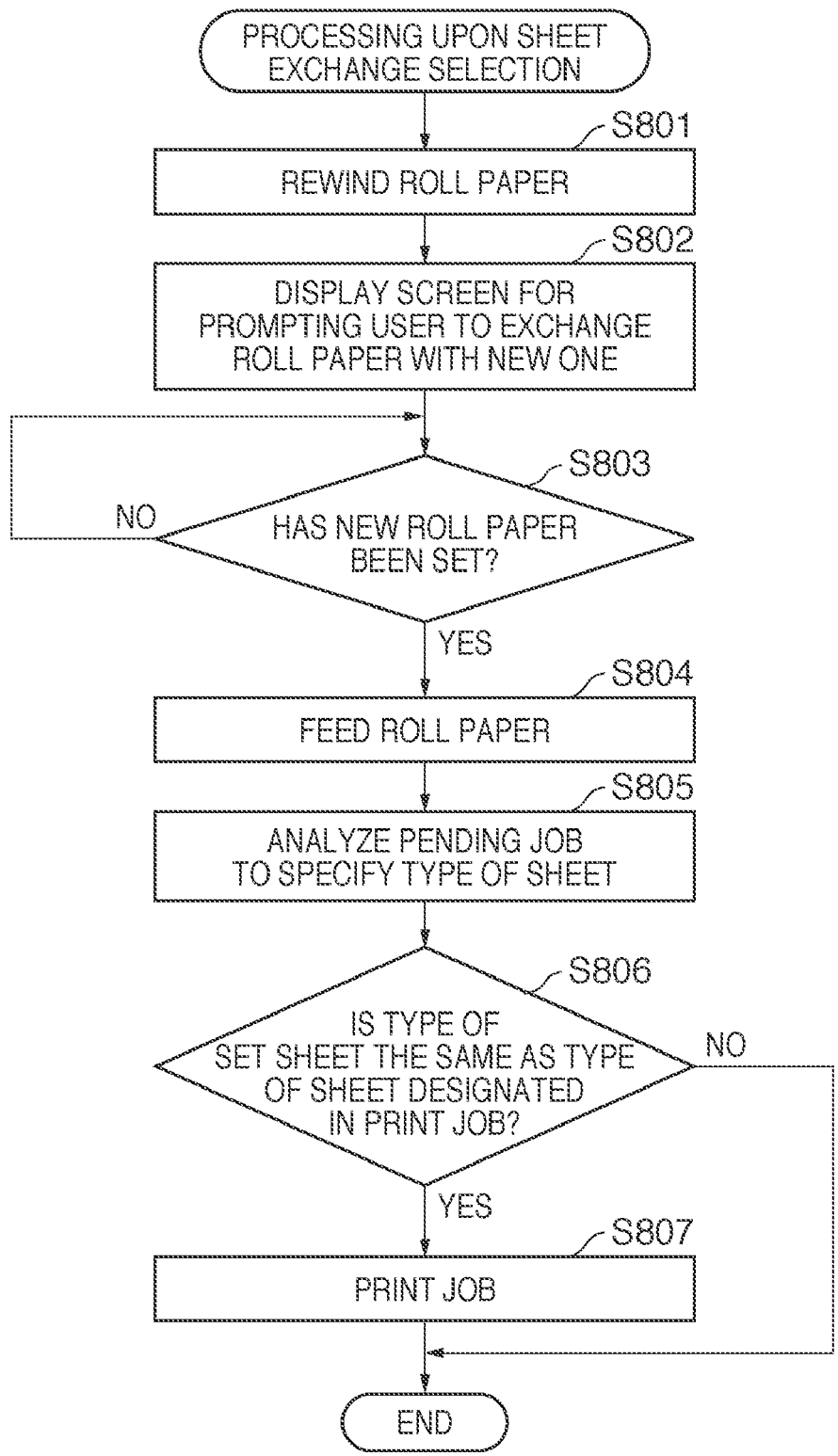
FIG. 8 is another flowchart showing the operation procedure of the image forming apparatus in the second embodiment.

FIGS. 6 and 8 are flowcharts showing the operation procedures of an image forming apparatus 1 in the second embodiment. The arrangement of a print system and the processing when a print job is received from a host computer 2 are the same as in the first embodiment, and a description thereof will not be given. The respective types of processing shown in FIGS. 6 and 8 are executed by processing programs built in a system memory 24 shown in FIG. 2 and a program memory 31 shown in FIGS. 3A and 3B by a controller microcomputer 21 and a engine microcomputer 32, respectively. The controller microcomputer 21 and engine microcomputer 32 execute a control operation in cooperation with each other.

FIG. 6 is a flowchart showing processing when the suspension time limit of a print job (pending job) suspended in the flowchart shown in FIG. 4A is determined. This processing is performed at a predetermined time interval (for example, per minute). In step S601, it is determined whether a pending job, the suspension time of which will reach the suspension time limit five minutes later, is present. If NO is determined in step S601, the processing shown in FIG. 6 ends. In this embodiment, the suspension time limit is decided in accordance with the ratio of the free space in the temporary storage area of an HDD 25 so that the larger the free space, the longer the decided suspension time limit; and the smaller the free space, the shorter the decided suspension time limit, as shown in FIG. 7A. In this case, assuming that the free space in the temporary storage area of the HDD 25 is 40%, the suspension time limit is decided as 24 hours on the screen shown in FIG. 7A. When the suspension time of each pending job is in a state shown in FIG. 5A, the suspension time of job A will reach the suspension time limit five minutes later. Therefore, in step S602, a screen for prompting the user to perform a suspension cancellation operation is displayed on the host computer 2. FIG. 7B is a view showing an example of a display screen for prompting the user to perform a suspension cancellation operation (an example of first display). The user can be warned that a pending job will be deleted five minutes (that is, the suspension time limit) later, and can select a suspension cancellation operation before the job is deleted, on the screen shown in FIG. 7B. The suspension cancellation operation can be selected from sheet exchange, forcible printing, movement, and deletion, as shown in FIG. 7B. In steps S603, S604, S605, and S606, it is determined which suspension cancellation operation has been selected by the user, and the process branches in accordance with the selected suspension cancellation operation.

If it is determined in step S603 that sheet exchange has been selected, the process advances to processing upon sheet exchange selection (to be described later) shown in FIG. 8. If it is determined in step S603 that sheet exchange has not been selected and in step S604 that forcible printing has been selected, the process advances to step S610. In step S610, the job is directly, forcibly printed on roll paper 5 which has currently been fed. Although a desired print result often cannot be obtained because the job is printed on a sheet of a type which does not match it, this processing is effective when, for example, the user has no optimum sheet at hand and wants to urgently print the job. After the process in step S610, the processing shown in FIG. 6 ends.

If it is determined in step S604 that forcible printing has not been selected and in step S605 that movement has been selected, the process advances to step S611. In step S611, the pending job is moved from the temporary storage area of the HDD 25 to its permanent storage area. This processing is effective when, for example, the user has no optimum sheet at hand and does not want to perform forcible printing. After the process in step S611, the processing shown in FIG. 6 ends.

If it is determined in step S605 that movement has not been selected and in step S606 that deletion has been selected, the process advances to step S612. In step S612, the pending job is immediately deleted. This processing is effective when, for example, the user has no optimum sheet at hand, he or she does not want to perform forcible printing, the permanent storage area has no free space, and he or she wants to immediately form a free space in the temporary storage area and print the next job. After the process in step S612, the processing shown in FIG. 6 ends.

On the display screen shown in FIG. 7B, suspension time limit extension can also be selected as an operation other than the suspension cancellation operation. If it is determined in step S606 that deletion has not been selected, it is determined in step S607 whether suspension time limit extension has been selected. If YES is determined in step S607, the process advances to step S613, in which the suspension time of the pending job is reset. FIG. 7C is a view showing the suspension time after the resetting. The suspension time of job A is reset to zero hours and zero minutes, as shown in FIG. 7C, and the time measurement starts again. As a result, the suspension time limit is extended. When, for example, the ratio of the free space in the temporary storage area at that time is 40%, the display screen shown in FIG. 7B is displayed 23 hours and 55 minutes later. After the process in step S613, the processing shown in FIG. 6 ends.

If it is determined in step S607 that suspension time limit extension has not been selected, the process advances to step S608. In step S608, it is determined whether the suspension time has reached the suspension time limit. If YES is determined in step S608, the pending job is deleted in step S609, and the processing shown in FIG. 6 ends. On the other hand, if NO is determined in step S608, the processes in step S603 and subsequent steps are repeated.

In this embodiment, the user is warned that a suspended print job will be deleted the moment the suspension time of this job soon reaches the suspension time limit (for example, five minutes later), which is decided based on the ratio of the free space on the HDD 25. Also, when the suspension time reaches the suspension time limit, the pending job is deleted. Moreover, not only "Sheet Exchange", "Forcible Printing", "Move", or "Delete" can be selected as a suspension cancellation operation via the warning screen, but also an operation of extending the time for which a pending job can be suspended (suspension time limit) can also be performed. Thus, the user can take an appropriate measure for a pending job before this job is deleted the moment the suspension time reaches the suspension time limit.

FIG. 8 is a flowchart showing the procedure of processing when sheet exchange is selected via the display screen shown in FIG. 7B. In step S801, the roll paper 5 which has currently been fed is rewound. In the rewinding, a roller 40 is rotated in the direction to rewind it by driving an LF motor 37. After the rewinding is completed, a screen for prompting the user to exchange the current roll paper 5 with roll paper 5 of the type (for example, coated paper) designated in the pending job is displayed on the host computer 2 in step S802. FIG. 7D is a view showing an example of a display screen for prompting the user to exchange the current roll paper with roll paper (coated paper) of the designated type. In step S803, it is determined whether the roll paper 5 (coated paper) of the type designated in the pending job has been set. If YES is determined in step S803, the roll paper 5 is fed in step S804. On the other hand, if NO is determined in step S803, the process in step S803 is repeated until it is determined that the roll paper 5 has been set.

After feed of the roll paper 5 is completed, the pending job is analyzed to specify the type of sheet in step S805. In step S806, it is determined whether the type of the newly fed roll paper 5 is the same as the type specified in step S805. At this time, if, for example, the type of the newly fed roll paper 5 is coated paper, YES is determined in step S806. In this case, printing is performed using the print job in step S807. On the other hand, if NO is determined in step S806, the processing shown in FIG. 8 ends without printing. With the processing shown in FIG. 8, the pending job can be correctly printed and the user can obtain a desired print result even when "Sheet Exchange" is selected on the screen shown in FIG. 7B and the current roll paper 5 is exchanged with the roll paper 5 of the type designated in the pending job.

In this embodiment, the user can be prompted to perform a suspension cancellation operation so as to prevent a pending job from being deleted when the suspension time of this pending job is approaching the suspension time limit. At this time, by providing several types of cancellation methods as suspension cancellation operations, the user can take an optimum measure according to the circumstances involved. Also, the pending job can be prevented from endlessly staying in the temporary storage area of the HDD 25, as in the first embodiment. As a result, no print start delay due to the requirement of the processing time to delete an old pending job when a new job is received occurs, thus making it possible to greatly shorten the time until the end of printing.

Third Embodiment

FIG. 9 is a flowchart showing the operation procedure of an image forming apparatus 1 in the third embodiment. The arrangement of a print system and the processing when a print job is received from a host computer 2 are the same as in the first embodiment, and a description thereof will not be given. The processing shown in FIG. 9 is executed by processing programs built in a system memory 24 shown in FIG. 2 and a program memory 31 shown in FIGS. 3A and 3B by a controller microcomputer 21 and a engine microcomputer 32, respectively. The controller microcomputer 21 and engine microcomputer 32 execute a control operation in cooperation with each other.

Figure 10A:
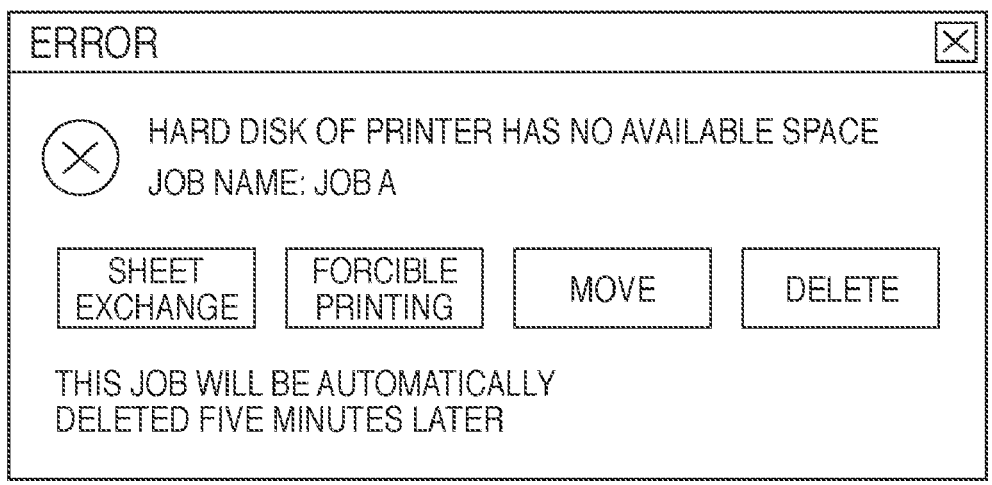
FIGS. 10A and 10B are views showing setting items and display screens for print jobs in the third embodiment.

FIG. 9 is a flowchart showing processing when the free space in the temporary storage area of an HDD 25 is determined (an example of free space determination). This processing is performed before a print job is newly stored in the temporary storage area of the HDD 25. In step S901, it is determined whether the temporary storage area of the HDD 25 has a free space. More specifically, it is determined whether the temporary storage area has a free space to store a print job newly received from the host computer 2. If YES is determined in step S901, the processing shown in FIG. 9 ends. On the other hand, if NO is determined in step S902, a screen for prompting the user to perform a suspension cancellation operation is displayed on the host computer 2. FIG. 10A is a view showing an example of a display screen for prompting the user to perform a suspension cancellation operation (an example of second display). The user can be warned that job A will be deleted five minutes later, and can select a suspension cancellation operation before the job is deleted, on the screen shown in FIG. 10A. Note that the job to be deleted is an oldest pending job stored in the temporary storage area of the HDD 25.

The selectable suspension cancellation operations and the processes (steps S903 to S906) are the same as in steps S603 to S606, respectively, of FIG. 6. In step S907, it is determined whether no operation has been selected for five minutes even after the display screen shown in FIG. 10A is displayed. If NO is determined in step S907, the processes in step S903 and subsequent steps are repeated. On the other hand, if YES is determined in step S907, the job is deleted in step S908, and the processing shown in FIG. 9 ends.

In this embodiment, the user is prompted to perform a suspension cancellation operation when the free space in the temporary storage area of the HDD 25 has run short before the suspension time of the pending job reaches the suspension time limit. This makes it possible to avoid the situation in which a print job newly received from the host computer 2 cannot be printed due to exhaustion of the temporary storage area of the HDD 25.

Figure 10B:
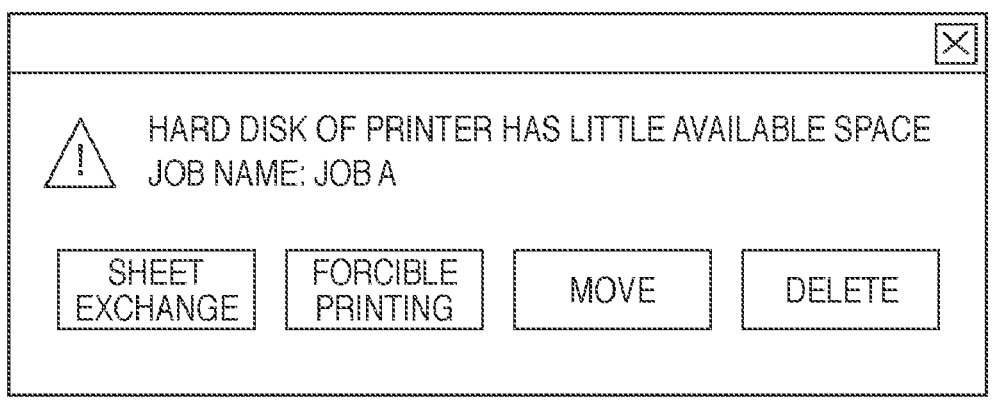

Instead of determining in step S901 whether the temporary storage area of the HDD 25 has a free space, it may be determined whether the temporary storage area has little free space. In this case, in step S902, a screen shown in FIG. 10B is displayed. In this case, a new print job can be printed even when no free space is formed in the temporary storage area of the HDD 25, so an old pending job is not deleted. Therefore, printing can immediately start without requiring a processing time for the deletion, thus making it possible to shorten the time until the end of printing as compared with the case shown in FIG. 10A. Also, the user can be prompted to take an appropriate measure for a pending job before the free space in the temporary storage area of the HDD 25 runs short.

Although only processing for a pending job suspended because the type of sheet set in this job is different from that set in the apparatus has been described above in the embodiments, pending jobs and other jobs may be handled separately. That is, the image forming apparatus 1 receives a print job transmitted from the host computer 2 as a stored job, and allows the job which is temporarily stored in the HDD 25 to remain without deletion. The stored job is a job which is temporarily stored in the HDD 25 and starts to be printed when the user issues an instruction to print it via the operation key 8. This job must be handled separately from pending jobs because its printing does not automatically start even when the type of sheet set in this job is the same as that set in the apparatus. However, the image forming apparatus 1 may be set such that even a stored job is deleted when it has not been printed for a predetermined time after its storage.

Also, in the above-described embodiments, when a print job stored in the HDD 25 is deleted, the deleted image may easily be able to be identified by printing, for example, a thumbnail image of the job or a job ID which specifies the job. Moreover, instead of printing, a thumbnail image of a print job or a report including, for example, a job ID which specifies the job may be transmitted to the host computer 2.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-003411, filed Jan. 8, 2010, which is hereby incorporated by reference herein in its entirety.

What is claimed is:

1. An image forming apparatus including a storage area to store a print job, the apparatus comprising:
   a reception unit configured to receive a print job to store in the storage area;
   an identification unit configured to identify whether a type of a printing medium set in the print job received by the reception unit is identical to a type of a printing medium provided in the image forming apparatus;
   a suspension unit configured to suspend print processing of the print job if the identification unit identifies that the type of the printing medium set in the print job is not identical to the type of the printing medium provided in the image forming apparatus;
   a determination unit configured to determine whether a suspension time period for which the print job has been suspended by the suspension unit elapses for a predetermined time period;
   a notification unit configured to notify a user of a notification including information for specifying the print job to be deleted if the determination unit determines that the suspension time period elapsed for the predetermined time period; and
   a deletion unit configured to delete the print job from the storage area in a case where the print job exists in the storage area after the notification unit notifies the user of the notification.

2. The apparatus according to claim 1, wherein the notification by the notification unit includes a selection item to select setting of the printing medium corresponding to the type of a printing medium set in the received print job in the image forming apparatus, forcible print processing using the printing medium provided in the image forming apparatus, movement of the print job to another storage area, deletion of the print job from the storage area, or continuing the suspension of the print processing of the print job in the storage area.

3. The apparatus according to claim 1, wherein the deletion unit deletes the print job from the storage area in a case where the print job exists in the storage area after a predetermined time period elapsed since the notification is notified by the notification unit.

4. The apparatus according to claim 1, wherein the deletion unit deletes the print job from the storage area in a case where the print processing of the print job has completed.

5. The apparatus according to claim 1, further comprising a setting unit configured to set a time period for suspending the print processing of the print job, wherein the determination unit determines whether the suspension time period elapses for the time period set by the setting unit.

6. The apparatus according to claim 5, wherein the setting unit sets the time period based on an instruction by a user.

7. The apparatus according to claim 5, wherein the setting unit sets the time period based on a free space of the storage area.

8. A method which controls an image forming apparatus including a storage area to store a print job and is executed in the image forming apparatus, the method comprising the steps of:
   receiving a print job to store in the storage area;
   identifying whether a type of a printing medium set in the print job received in the receiving is identical to a type of a printing medium provided in the image forming apparatus;
   suspending print processing of the print job if it is identified in the identifying that the type of the printing medium set in the print job is not identical to the type of the printing medium provided in the image forming apparatus;

determining whether a suspension time period for which the print job has been suspended in the suspending elapses for a predetermined time period;

notifying a user of a notification including information for specifying the print job to be deleted if the determining determines that the suspension time period elapsed for the predetermined time period; and deleting the print job from the storage area in a case where the print job exists in the storage area after the notifying notifies the user of the notification.

9. A non-transitory computer-readable storage medium storing a program for causing a computer serving as an image forming apparatus including a storage area to store a print job to function to:

receive a print job to store in the storage area;

identify whether a type of a printing medium set in the received print job is identical to a type of a printing medium provided in the image forming apparatus;

suspend print processing of the print job if it is identified that the type of the printing medium set in the print job is not identical to the type of the printing medium provided in the image forming apparatus;

determine whether a suspension time period for which the print job has been suspended elapses for a predetermined time period;

notify a user of a notification including information for specifying the print job to be deleted if it is determined that the suspension time period elapsed for the predetermined time period; and delete the print job from the storage area in a case where the print job exists in the storage area after the user is notified of the notification.

* * * * *